United States Patent [19]
Matsumoto et al.

[11] Patent Number: 6,045,473
[45] Date of Patent: Apr. 4, 2000

[54] PLATE FOR A SILENT CHAIN

[75] Inventors: Masaaki Matsumoto, Hanno; Haruo Sugita, Hidaka; Koichi Kaihotsu, Hanno; Makoto Kanehira, Iruma; Takayuki Funamoto, Hanno; Nobuyuki Fujimoto; Hitoshi Ohara, both of Iruma; Masao Maruyama, Hanno, all of Japan

[73] Assignee: Tsubakimoto Chain Co., Osaka, Japan

[21] Appl. No.: 09/028,481

[22] Filed: Feb. 24, 1998

[30] Foreign Application Priority Data

Feb. 26, 1997 [JP] Japan ................................ 9-042398

[51] Int. Cl.[7] ................................................ F16G 13/04
[52] U.S. Cl. ........................................................ 474/212
[58] Field of Search .................................... 474/206, 212, 474/213, 153, 155, 156, 157; 29/557, 558

[56] References Cited

U.S. PATENT DOCUMENTS

| | | | |
|---|---|---|---|
| 1,580,910 | 4/1926 | Layman et al. | 29/892 |
| 5,588,926 | 12/1996 | Mott et al. | 474/212 |
| 5,690,571 | 11/1997 | Mott | 474/212 |
| 5,803,854 | 9/1998 | Tada et al. | 474/213 |
| 5,848,948 | 12/1998 | Allen | 474/212 |

Primary Examiner—David A. Bucci
Assistant Examiner—Matthew A. Kaness
Attorney, Agent, or Firm—Armstrong, Westerman, Hattori, McLeland & Naughton

[57] ABSTRACT

A plate for a silent chain has a side punched into a forked shape for engagement with a sprocket. The forked side of the plate has inner engaging surfaces opposing each other, outer engaging surfaces, and an arcuate leg-side end surface connecting the inner engaging surfaces. The leg-side end surface, on which stress is likely to be concentrated, has a shear face tissue along at least 70% of the thickness of the plate. A silent chain having such a plate has a high plate fatigue strength and enhanced durability and reliability, and can be manufactured at a low cost.

2 Claims, 5 Drawing Sheets

PLATE FOR A SILENT CHAIN

TECHNICAL FIELD OF THE INVENTION

The present invention generally relates to a plate for a silent chain and more particularly, to a plate for a silent chain, wherein the plate has a side which is punched into a forked-shaped for engagement with a sprocket and a leg-side end, on which stress is likely to be concentrated, which is finished into a smooth surface so as not to have rupture surface tissue over 70% or more of the thickness of the plate.

DESCRIPTION OF THE RELATED ART

In a conventional silent chain which is widely used to drive auxiliaries of the engine or similar, a number of plates P, having a side which is punched into a forked shape for engagement with a sprocket, are put upon one another. In this state, the plates P are connected to each other by means of chain pins Q in an endless manner, as shown in FIG. 5.

The plates P, thus connected by the chain pins Q, constitute a silent chain C. The plates P are constructed such that a side engaged with a sprocket (not shown), except for the guide plates G arranged on opposite outer sides thereof, is formed into a forked shape. In the case of an outer side-leg being engaged with the sprocket, two faces R1, on opposite sides of the forked portion, constitute a face engaged with the sprocket. However, in the case of an inner side-leg being engaged with the sprocket, two faces R2, on opposite inner sides of the forked portion, constitute a face engaged with the sprocket.

That is, for example, in the case of the outer side-leg engagement, as shown in FIG. 6, a side-leg B is opposed to an extreme end of one tooth M of the sprocket S leaving a slight clearance therebetween. Faces R1, on opposite outer sides in a longitudinal direction of the plate P, come into contact with engaging faces t of teeth M', M" on opposite sides adjacent to the tooth M to provide the transfer of power between the sprocket S and the silent chain C constituted by numerous plates P.

As previously mentioned, since the plate P for the silent chain C has the side engaged with the sprocket being formed into a forked shape, when tension is exerted on the chain C, stress tends to be concentrated on the side-leg of the plate P.

Conventionally, since a plate P for a silent chain C is generally molded by press punching a steel plate as the blank material, a smooth shear surface tissue F and a rough rupture surface tissue R are present on the end of the surface of the punched plate P in a mixed manner. As shown in FIG. 7, the rupture surface tissue R sometimes occupies 50% or more of the thickness T of the plate P.

Thus, a particular problem has been encountered in that at a spot, like a side-leg of the plate, where stress is concentrated, the rough rupture surface tissue R, as described above, forms a starting point for fatigue breakdown to lower the fatigue strength of the silent chain C.

On the other hand, fine blanking has been known as a conventional punching technique which does not generate a rupture surface tissue R having a rough surface. However, fine blanking has the problem that the punching speed is so low, i.e, from about ⅕ to 1/10 the speed of conventional punching techniques, that the working efficiency is low as compared with the normal press punching. Further, since a pressure allowance is required for the blank material, the stock utilization is poor and thus, the manufacturing cost of the silent chain C is increased.

In view of the foregoing, the present invention overcomes the problems as noted above with respect to the prior art, and has as its object to provide a silent chain which is high in plate fatigue strength, which can enhance durability and reliability, and which can be manufactured at a low cost.

SUMMARY OF THE INVENTION

For achieving the aforementioned object, the present invention provides a plate for a silent chain which includes a side which is punched into a forked shape for engagement with a sprocket, and a leg-side end of the plate is finished into a smooth surface so as not to have rupture face tissue over a range of 70% or more of the thickness of the plate.

Preferably, the leg-side end is punched prior to the plate being punched out of a blank material.

During the operation of the silent chain, stress is concentrated on the side-legs of the plates constituting the chain by the tension exerted on the chain. Therefore, when the plates are fabricated by being punched out from a blank material, since the side-leg end is formed with rupture surface tissue over 50% or more of the plate thickness, fine cracks are formed in the rough rupture surface tissue of the side-leg end of the plates. The fine cracks grow when stress is concentrated and this could possibly lead to a fatigue breakdown.

Accordingly, in the present invention, the leg-side end of the plate is finished into a smooth surface, which does not have rupture face tissue over a range of 70% or more of the thickness of the plate. Thus, the fine cracks in the surface, which bring forth the fatigue breakdown, are reduced to prevent the fatigue breakdown of the plate.

On the other hand, because the plates are punched out from a blank material, the punched surface of an initial portion of the plate punched out from the blank material and the punched surface of a remaining portion of the plate are such that the punched surface of the remaining portion has less rupture face tissue with respect to the plate thickness than the punched surface of the initial portion of the plate, so that 70% or more of the plate thickness of the initial portion of the plate has a smooth shear face tissue.

Accordingly, when the side-leg end of the plate is formed by punching prior to the plate being punched out from the blank material, the initial portion has 70% or more of its side-leg and plate thickness being smooth shear face tissue so that the strength of the plate is increased and thus, fatigue breakdown is less likely to occur.

It should be noted that the reason why 70% or more of the plate thickness is smooth shear face tissue is so that the practical strength of the plate is obtained and thus, only the punching of the plate will suffice for realization of increased plate strength and prevention of fatigue breakdown.

BRIEF DESCRIPTION OF THE DRAWING FIGURES

DETAILED DESCRIPTION OF THE INVENTION

Figure 1:
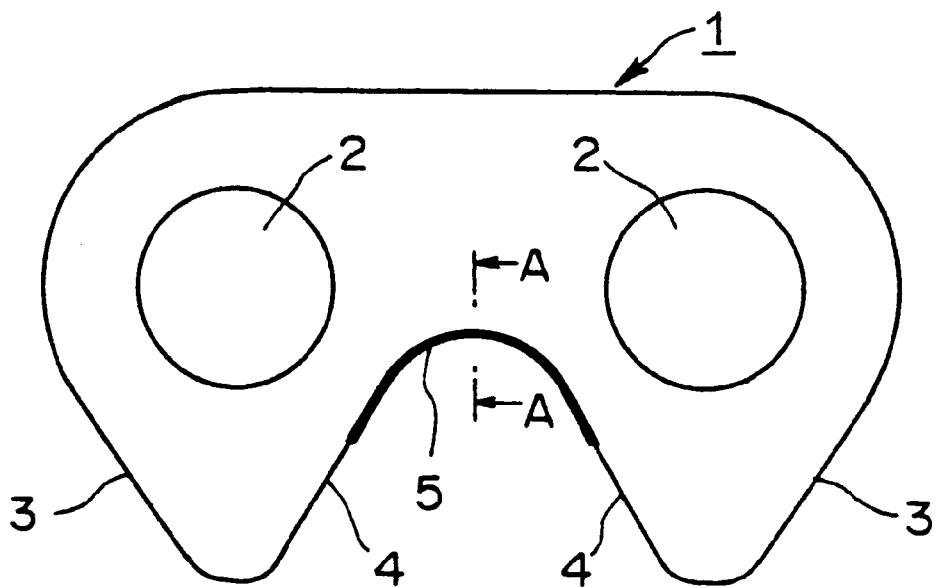
FIG. 1 is a side view showing a first embodiment of a plate for a silent chain according to the present invention.

The present invention will be explained in detail with reference to the drawing figures. FIG. 1 shows a first embodiment of a plate for a silent chain accordingly to the present invention. A plate 1 is formed with a pair of pin holes 2 into which chain pins (not shown) are inserted. When formed as a silent chain, a side of the plate 1, which engages with a sprocket, is formed into a forked shape to comprise outer engaging surfaces 3 and inner engaging surfaces 4 which are each arranged at an angle with respect to the longitudinal axis of the plate 1.

The plate 1 is formed by being punched out of a steel plate blank, as will be described later. A side-leg end 5, in which the inner engaging surfaces 4 on the opposite sides are circularly continuous, is particularly smoothly finished more than other portions of a peripheral edge of the plate 1.

Figure 2:
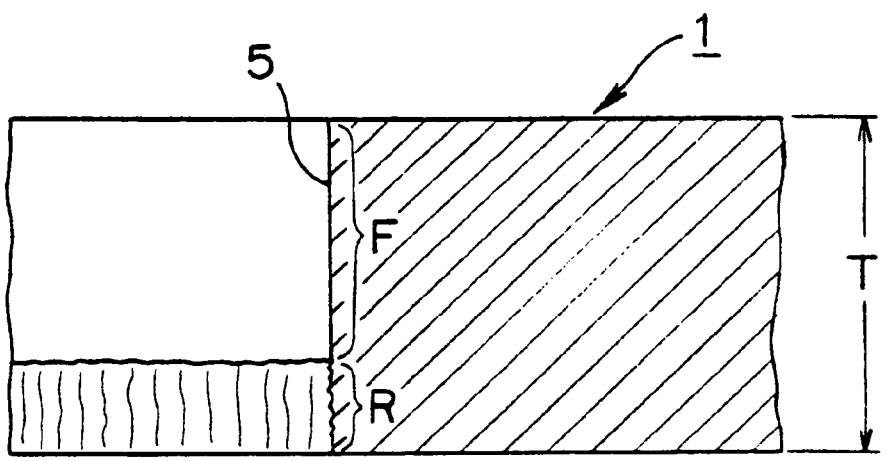
FIG. 2 is a partly enlarged cross-sectional view as viewed in the direction of the arrows at a position taken along line A—A of FIG. 1.

FIG. 2 is a partly enlarged cross-sectional view, as viewed in the direction of the arrows at a position taken along lines A—A of FIG. 1, showing the state of the surface of the side-leg end 5. A rupture face tissue R, generated when the plate 1 is punched, is less than 30% with respect to the thickness T of the plate 1, and of the remaining portion, 70% or more is a shear face tissue F having a smooth surface.

Figure 3:
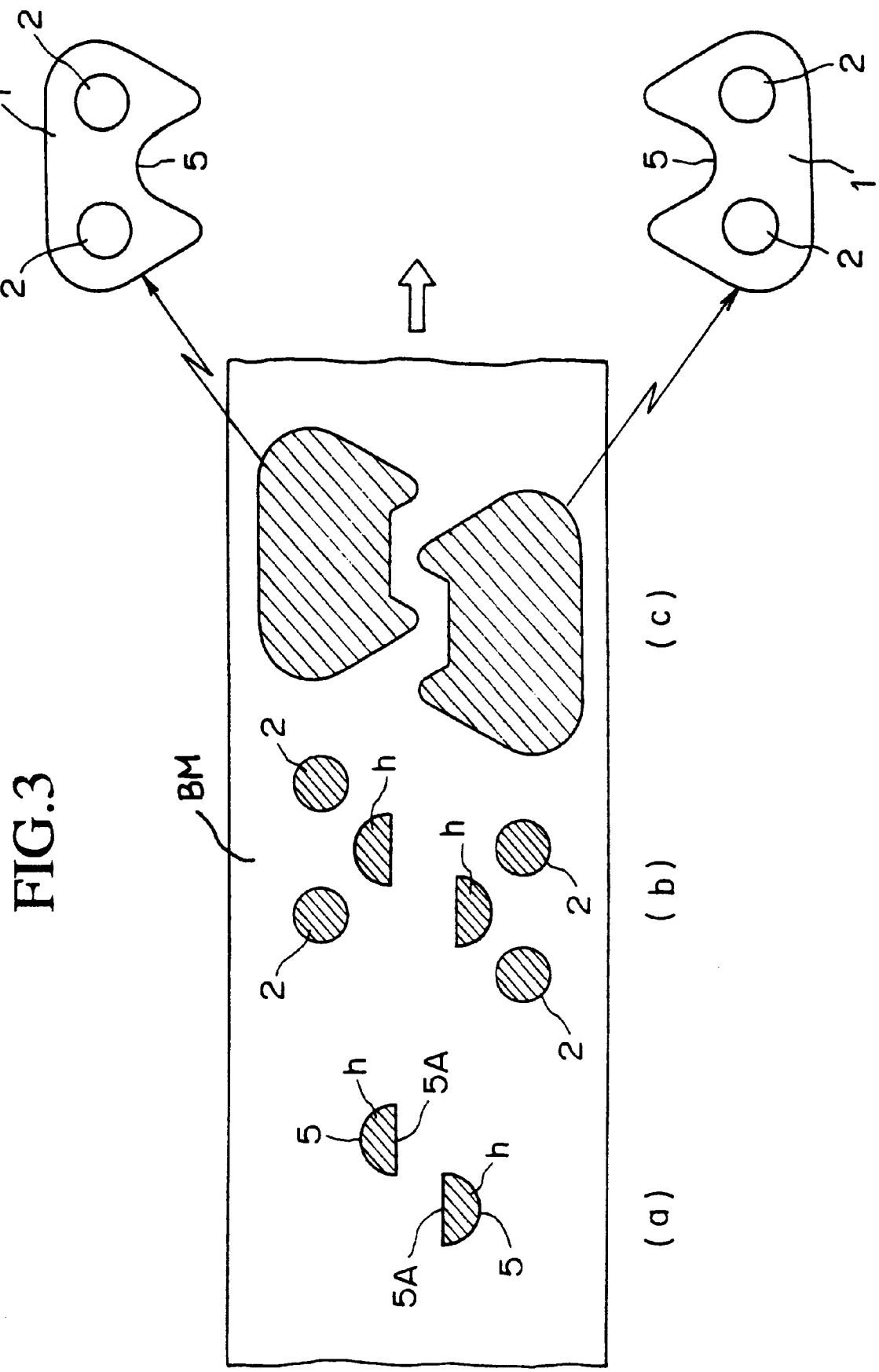
FIG. 3 is a schematic view showing the steps of manufacturing the plate for the silent chain according to the present invention.

Next, FIG. 3 is a schematic view showing the steps of manufacturing the plate 1 by punching, wherein the plate 1 has the side-leg end 5 finished as described above. A blank material BM, of a web-like steel plate forming a blank for the plate 1, is subjected to a punching operation at operating positions (a), (b) and (c) while being successively moved in the direction of the arrow as shown in FIG. 3.

In other words, at the position (a), the punching operation is carried out to form an arcuate contour of the side-leg end 5 of the plate 1 in the blank material BM so that a waste hole h is punched through the blank material BM. Since in the first embodiment, a material for the plate 1 is secured in two rows within the width of the web-like steel plate blank material BM, the waste hole is formed into a half-moon shape. The side opposite to the side of the side-leg end 5 is formed to be a straight line portion 5A to make the distance between the two rows of plates 1 closer. Thus the waste portion of the blank material BM is reduced. Preferably, the waste hole h is shaped so that the rows of two plates 1 can be made as close as possible depending on the strength of the punching tool.

The blank material BM having finished the punching operation of the waste hole h at the position (a), is fed to a position (b) in the direction of the arrow, where pin holes 2 are punched. Then, the blank material BM, having finished the punching operation at the position (b), is further moved in the direction of the arrow to reach a position (c), where a contour of the plate 1, of portions other than the side-leg end 5 already punched, is punched so that the completed plate 1 is separated from the blank material BM.

The respective punching operations at the position (a), (b) and (c) is stopped at those positions, so that the plates 1 are manufactured in pairs every time a blank material B is fed to the punching tool.

Figure 4:
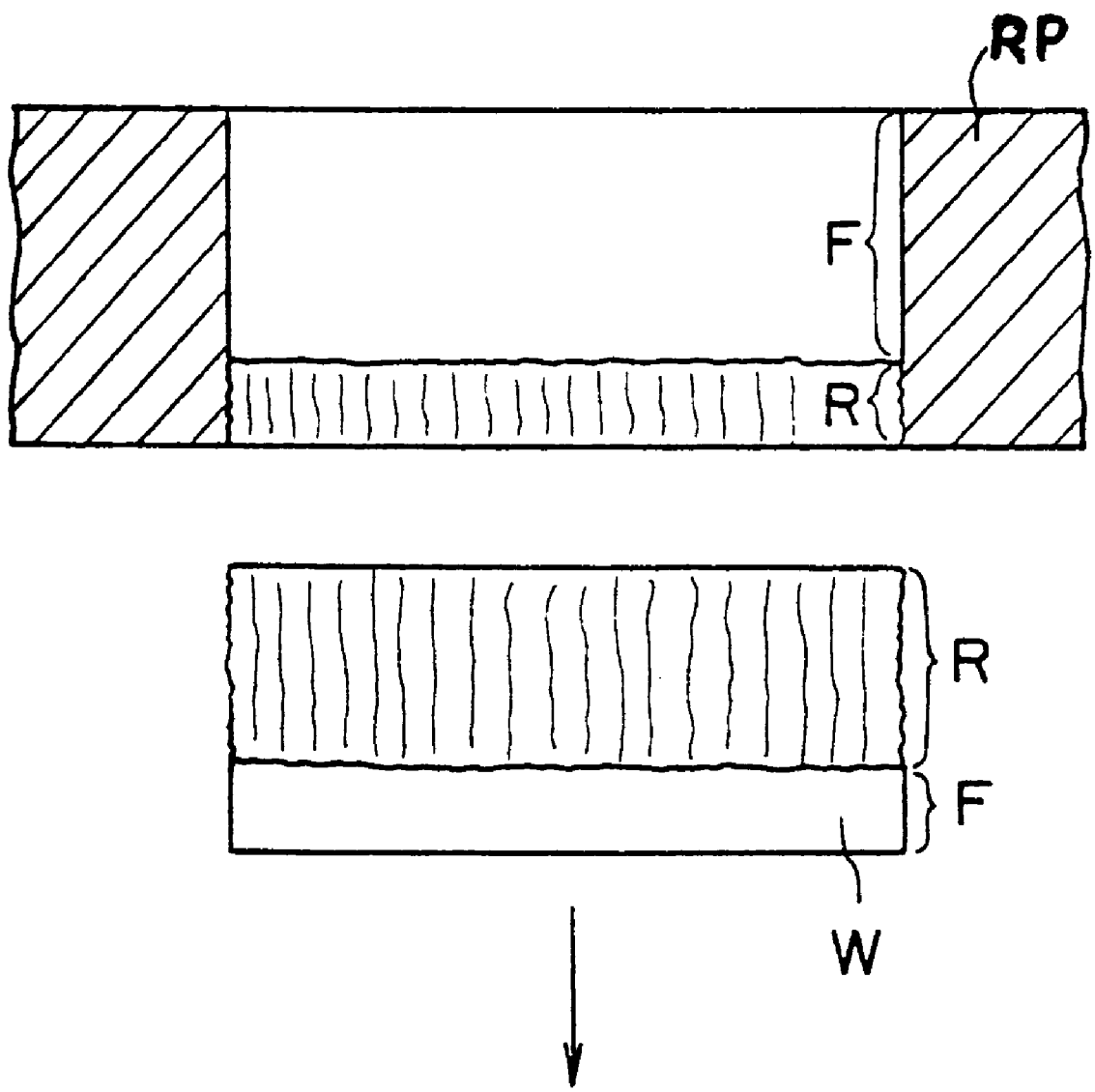
FIG. 4 is a schematic view showing the state of the punched surfaces of a portion punched from a blank material and a remaining portion.
Figure 5:
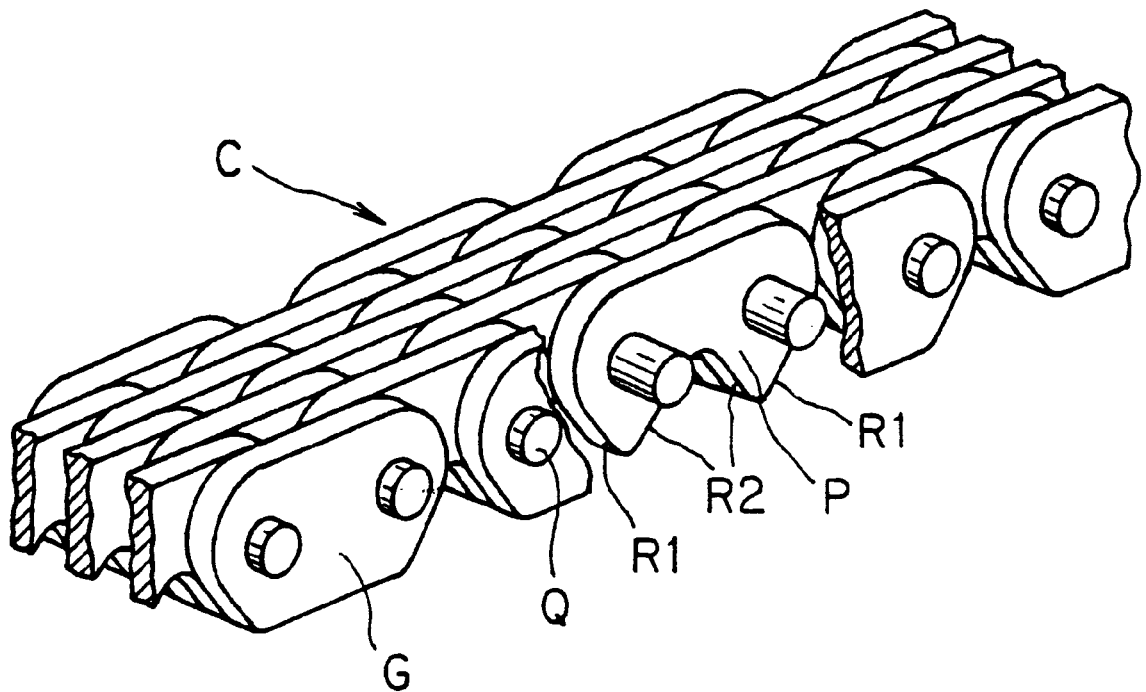
FIG. 5 is a perspective fragmentary view showing an external appearance of a general silent chain heretofore used.
Figure 6:
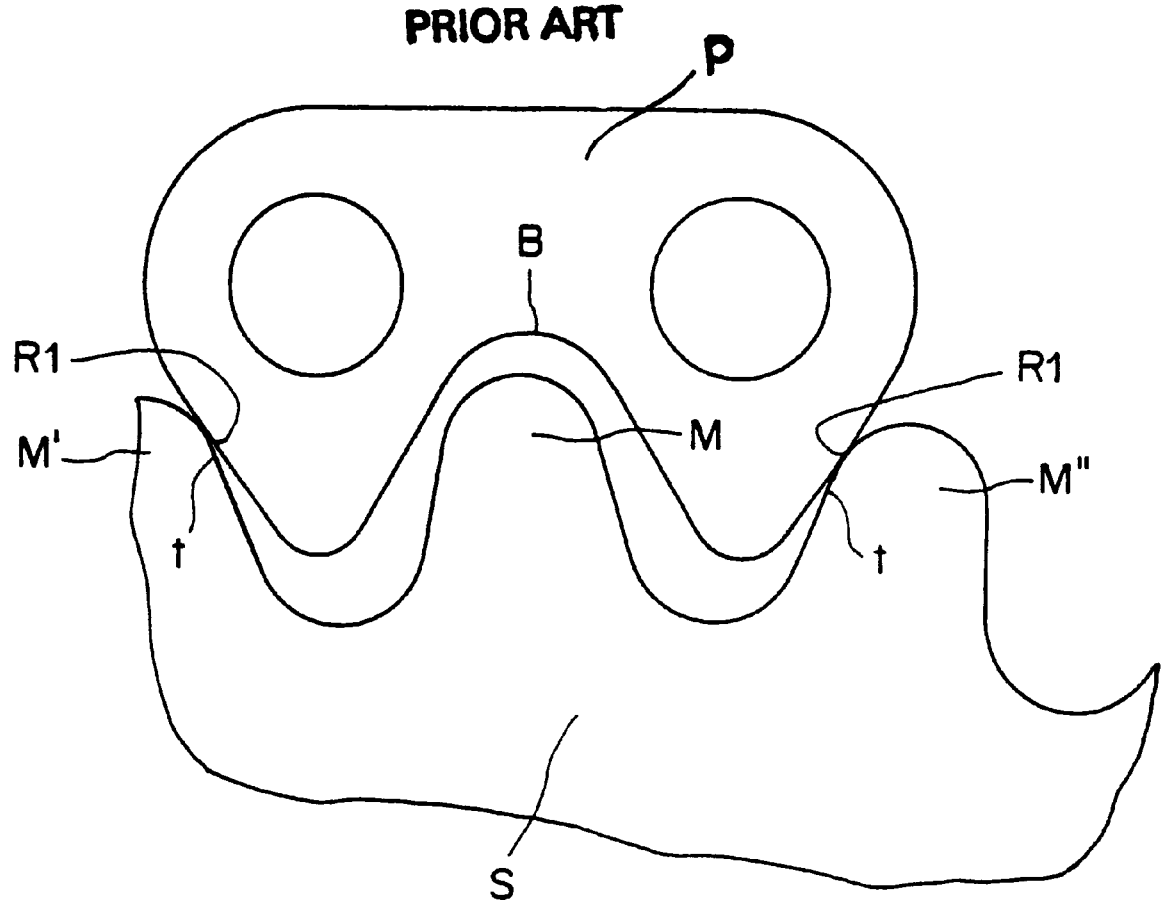
FIG. 6 is a view showing the engaged state between a plate and a sprocket.
Figure 7:
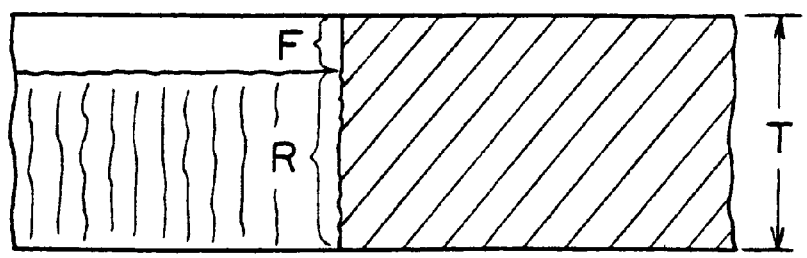
FIG. 7 is a partly enlarged cross-sectional view showing the finished state of a side-leg end of a plate of a conventional silent chain.

When the plate 1 is manufactured by the progressive steps as shown in FIG. 3 and as described above, a smooth shear face tissue in the range 70% or more of the plate thickness is formed on the side-leg end 5 as shown in FIG. 2 described above. In the general punching, as shown in FIG. 4 and as compared with a portion W punched and separated from the side of the blank material BM, the punched surface of the punched portion W and the punched surface of the remaining portion RP of the blank material BM are such that the punched surface of the remaining portion RP has a lesser proportion of a rupture face tissue R with respect to the plate thickness than the punched surface of the punched portion W and 70% or more of the plate thickness is a smooth shear face tissue F.

Note, in the manufacturing step shown in FIG. 3, since an inner surface of the pin hole 2 also was 70% or more of the plate thickness being finished into a smooth shear face tissue, when the plates 1 are connected with each other by the chain pins to provide a silent chain, it is possible to secure the necessary accuracy.

Further, note that although in the manufacturing step of the plate 1 shown in FIG. 3, the whole plate 1 is punched at the position (c) from the blank material B after the waste hole h for forming the side-leg end 5 has been punched at the position (b) from the blank material BM, the waste hole h and the whole contour of the plate 1 may be punched using a punching tool, such as a stepped punch, at a single position.

Further, note that although in the aforementioned first embodiment, the portion of the side-leg end 5 of the plate 1 which has 70% or more of the plate thickness being the smooth shear face tissue formed by the punching steps shown in FIG. 3, cutting or grinding may be applied to only the side-leg end 5 to finish it smoothly after the outer contour of the plate has been punched.

As described above, according to the present invention, since the leg-side end of the plate of the silent chain is finished into a smooth surface, which does not have rupture face tissue, over the range of 70% or more of a thickness of the plate, the fine cracks in the surface which bring forth the fatigue breakdown are less likely to occur in the side-leg end, and the fatigue breakdown of the plate can be prevented, resulting in enhanced durability of the silent chain.

Moreover, since the fatigue strength of the plate can be enhanced merely by finishing only the side-leg end of the plate into a smoother surface than the other portions and since stress is concentrated on the side-leg end when the silent chain is used, the stock utilization of the plate material can be enhanced and the production efficiency can be enhanced. Furthermore, the manufacturing cost can be lowered, at least as compared with a silent chain formed from plates manufactured by a process not generating a rupture face tissue, as is the case with conventional fine blanking.

Further, particularly when the side-leg end of the plate is formed by punching prior to the punching of the plate from the blank material, the step of separately finishing the side-leg end after punching is not necessary. Thus, the production efficiency of the silent chain is further enhanced and the manufacturing cost is further lowered.

We claim:

1. A press-formed plate for a silent chain comprising:

a side punched into a forked shape for engagement with a sprocket, said forked side having inner engaging surfaces opposing each other, outer engaging surfaces facing away from each other, and an arcuate leg-side end surface connecting said inner engaging surfaces; and said leg-side end surface having a shear face tissue along at least 70% of the thickness of said plate.

2. The plate for the silent chain according to claim 1, wherein said leg-side end surface is punched prior to punching of said plate from a blank material.

* * * * *